United States Patent [19]

Wong et al.

[11] Patent Number: 5,651,030
[45] Date of Patent: Jul. 22, 1997

[54] RECEIVER WITH SIGNAL CLASSIFIER

[75] Inventors: Chin-Pan Wong, Ft. Lauderdale; Richard S. Young, Sunrise, both of Fla.

[73] Assignee: Motorola, Inc., Schaumburg, Ill.

[21] Appl. No.: 696,466

[22] Filed: May 6, 1991

[51] Int. Cl.$^6$ ............................................. H04L 27/06
[52] U.S. Cl. .......................................... 375/316; 455/226.1
[58] Field of Search .................................. 375/75, 10, 96, 375/224, 316, 343; 455/67, 115, 226.1; 324/77 B, 77 C

[56] References Cited

U.S. PATENT DOCUMENTS

| | | | |
|---|---|---|---|
| 3,919,479 | 11/1975 | Moon | 455/226.1 |
| 4,227,255 | 10/1980 | Carrick et al. | 328/140 |
| 4,501,020 | 2/1985 | Wakeman | 455/226 |
| 4,516,215 | 5/1985 | Hakaridani et al. | 381/43 |
| 5,048,015 | 9/1991 | Zilberfarb | 375/10 |

*Primary Examiner*—Stephen Chin
*Attorney, Agent, or Firm*—M. Mansour Ghomeshi

[57] ABSTRACT

Briefly, according to the invention, a receiver (100) for receiving and decoding a carder signal is described. A carrier signal is modulated with an information signal which has one of a plurality of formats. The receiver includes a circuit (104) for receiving and demodulating the carrier signal to produce a demodulated signal. The receiver (100) also includes a digital signal processing subsystem (108) for calculating the correlation function of the demodulated signal and based on this correlation function classifies the format of the demodulated signal. A decoder (118) is further included in the receiver (100) to decode the demodulated signal once it has been classified.

12 Claims, 6 Drawing Sheets

5,651,030

RECEIVER WITH SIGNAL CLASSIFIER

TECHNICAL FIELD

This invention relates generally to receivers and more particularly to receivers adapted for receiving signals having different formats.

BACKGROUND

In traditional Frequency Modulation (FM) transmitters, voice is bandpassed, pre-emphasized, and frequency modulated to a Radio Frequency (RF) channel. However, with recent advancements in digital transmission technologies, voice can now be digitized before transmission. Various coding algorithms are available to digitize voice signals. A voice signal digitized at a transmitter using a particular algorithm must be decoded at the receiver using a complement of that particular algorithm. Furthermore, many receivers are capable of receiving digital data along with digitized voice. With a variety of digital signals being coded via a variety of coding algorithms, receivers must be smart in classifying a received signal before attempting to decode it. This is needed so that the receiver could invoke the appropriate decoder suited for the job. An alternative to classifying incoming signals is for receivers to have a number of hardware decoders. In such receivers, a demodulated received signal is simultaneously applied to all the available decoders. The output of the one decoder with the correct output is then presented to the user. This method could be very costly and highly inefficient in its current requirements. It is therefore clear that a need exists for a receiver that would classify an incoming signal before attempting to decode it.

SUMMARY OF THE INVENTION

Briefly, according to the invention, a receiver for receiving and decoding a carrier signal is described. The carrier signal is modulated with an information signal which has one of a plurality of formats. The receiver includes means for receiving and demodulating the carrier signal to produce a demodulated signal. The receiver also includes means for calculating the correlation function of the demodulated signal and based on this correlation function classify the format of the demodulated signal. A decoder means is further included in the receiver to decode the demodulated signal once it has been classified.

In other aspects of the invention, a method is described for efficiently receiving and decoding a carrier signal being modulated with an information signal having one of a plurality of formats. The method includes a step for receiving and demodulating the carrier signal to recover the information signal. Other steps include calculating the correlation function of the information signal and based on this correlation function, determining the format of the information signal. A further step is included for decoding the information signal.

DETAILED DESCRIPTION OF THE PREFERRED EMBODIMENT

Figure 7:
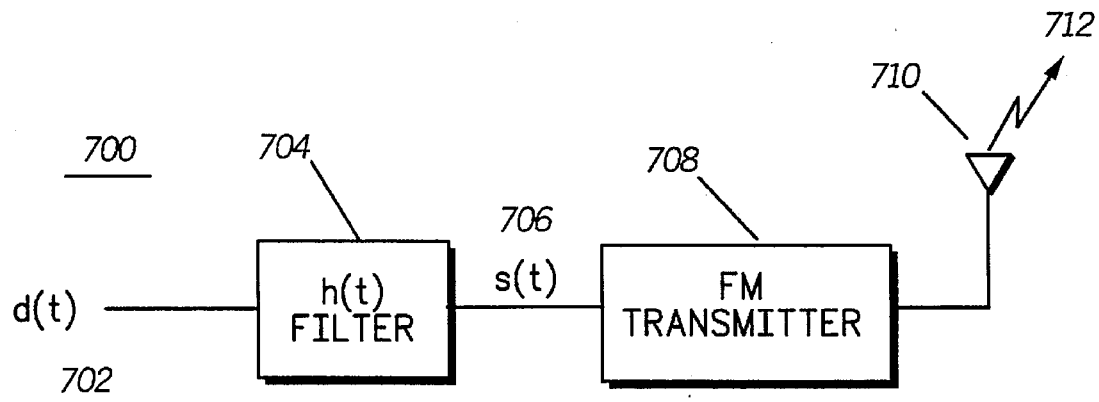
FIG. 7 is a FM transmitter including a filter h(t).

Referring first to FIG. 7, a transmitter 700 is shown to include a filter h(t) 704 and a Frequency Modulation (FM) transmitter. The input and output of the filter 704 are d(t) 702 and s(t) 706 respectively. In the preferred embodiment, the symbol rate is 4800 symbols/sec and the data is four level Frequency Shift Keying (FSK). Furthermore, the filter h(t) 704 has an impulse response of the square-root of raised-cosine pulse. If the data d(t) 702 is randomly distributed and has a zero mean, the output s(t) 706 should have a spectrum H(w) where H(w) is the Fourier transform of h(t). Furthermore, since the auto-correlation function of s(t) 706 is defined as:

$$R_{yy}(\tau) = E[s(t)s(t+\tau)]$$

it can be shown that $$R_{yy}(\tau) = R_{dd}(\tau) * h(t) * h'(-t)$$

where "'" denotes complex conjugate and "*" denotes convolution. If signal d(t) 702 is a Wide Sense Stationary (WSS) process, then $R_{dd}(\tau)$ statistically should only depend on "$\tau$". Since both h(t) and h'(−t) are deterministic, it implies that $R_{yy}$ is also WSS. The signal s(t) 706 is applied to an FM transmitter 708 which has a set deviation level. The Radio Frequency (RF) signal output of the transmitter 708 is a carrier signal 712 which is transmitted via an antenna 710.

Figure 3:
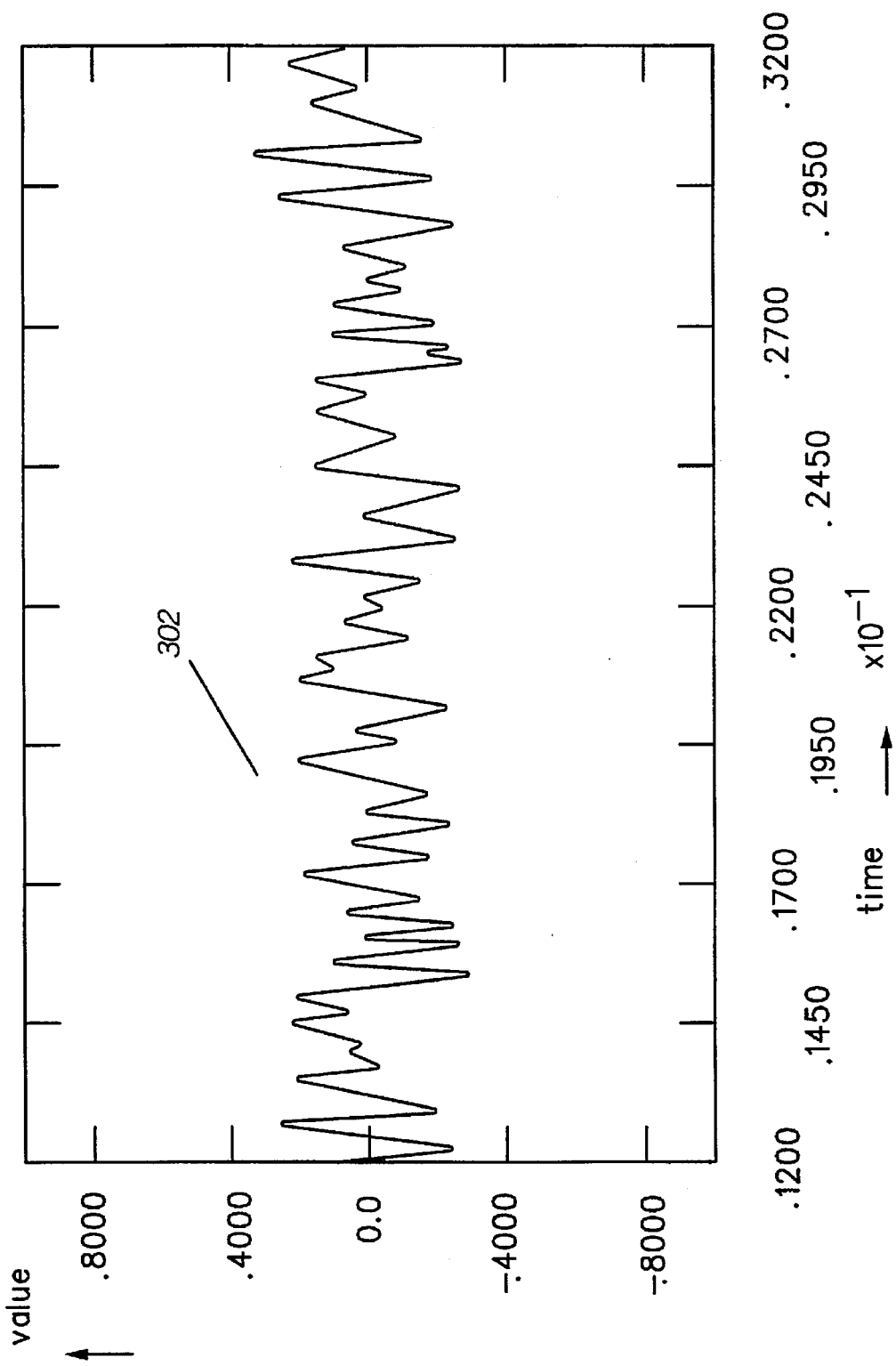
FIG. 3 is a graph of a multi-level signal without any noise components.
Figure 5:
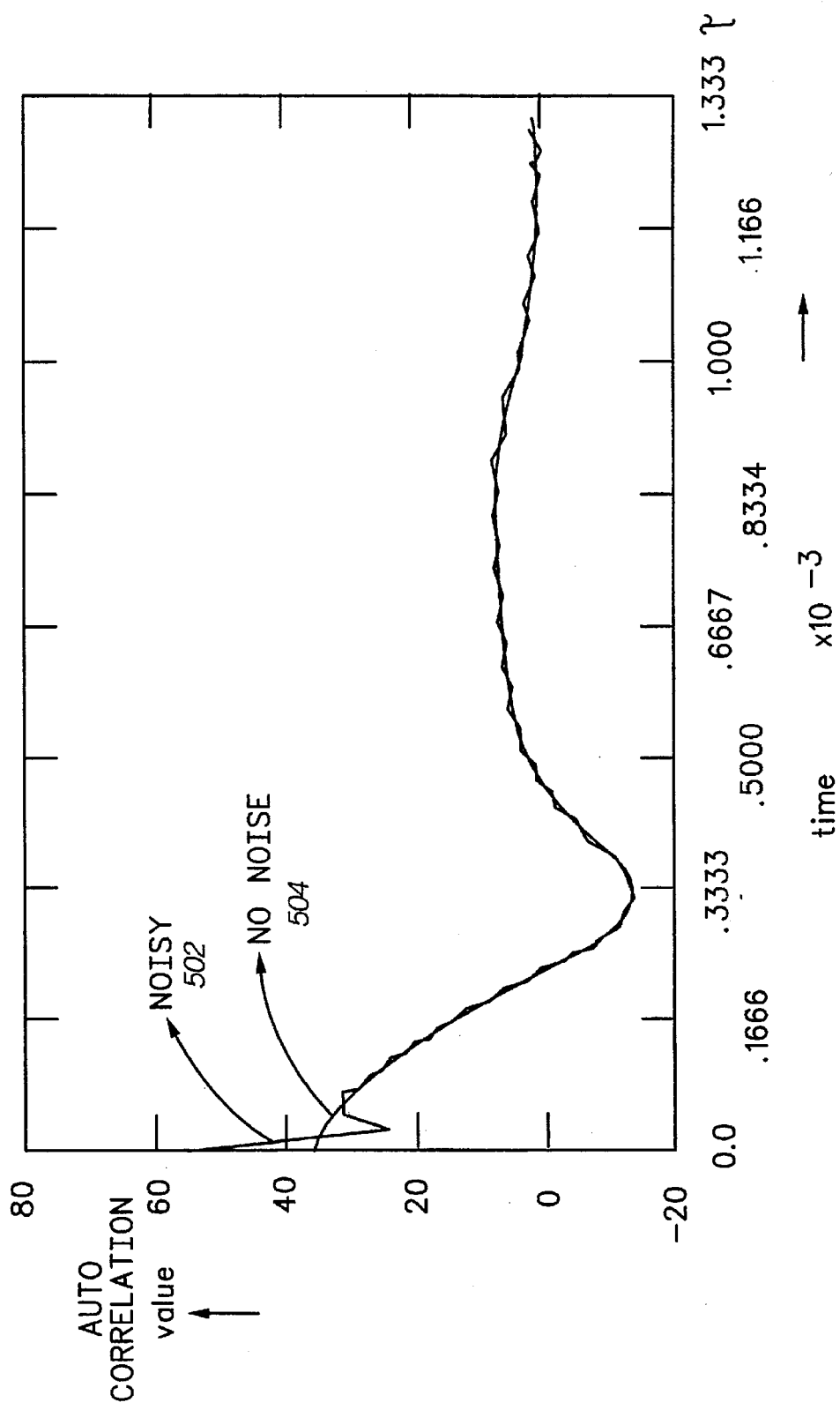
FIG. 5 is a graph of auto-correlation functions of the signals of FIG. 3 and FIG. 4.
Figure 6:
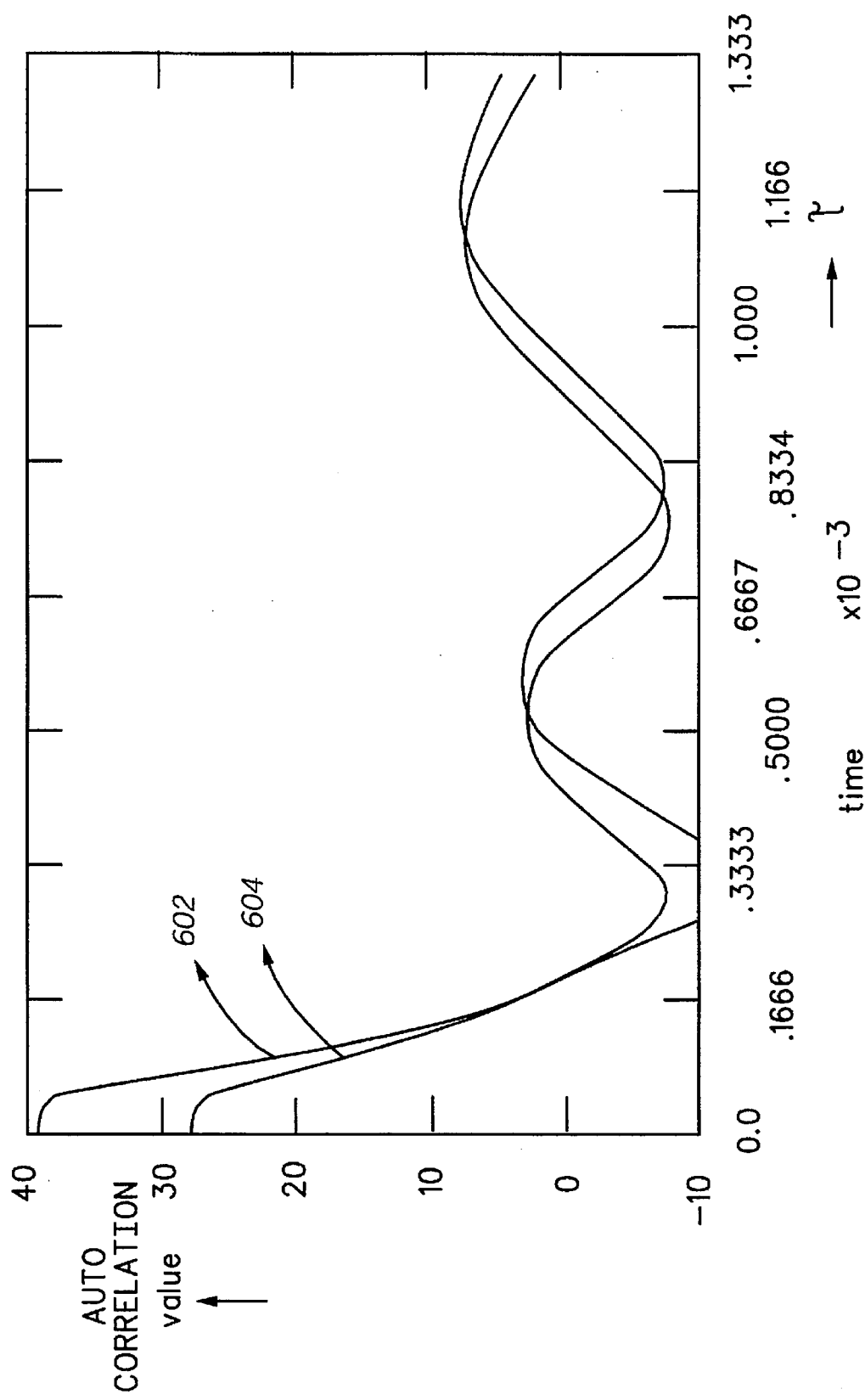
FIG. 6 is a graph of two auto-correlation functions of a signal at two different windows.

FIG. 3 shows a representative portion of the signal s(t) 706. The signal s(t) 706 is a four level FSK signal which is a multi-level digital signal. The four levels are distinctly shown without any noise components. Referring to FIG. 6, samples of the auto-correlation function 602 and 604 of the signal s(t) 706 are shown taken at two different windows. It can be seen that they both closely follow the same pattern with minor amplitude variations. It is the shape characteristics of the auto-correlation functions that will be used to classify a received signal and not necessarily its instant amplitudes. Indeed as will be shown, a normalization of several sample points of the auto-correlation function is performed in order to classify the signal. FIG. 5 on the other hand, shows an auto-correlation function $R_{yy}(\tau)$ 504 of the signal s(t) 706 taken at yet a third window. This auto-correlation function 504 is superimposed on an auto-correlation function 502 belonging to a received signal having noise components. References will be made to the auto-correlation function 502 later in this description.

Figure 1:
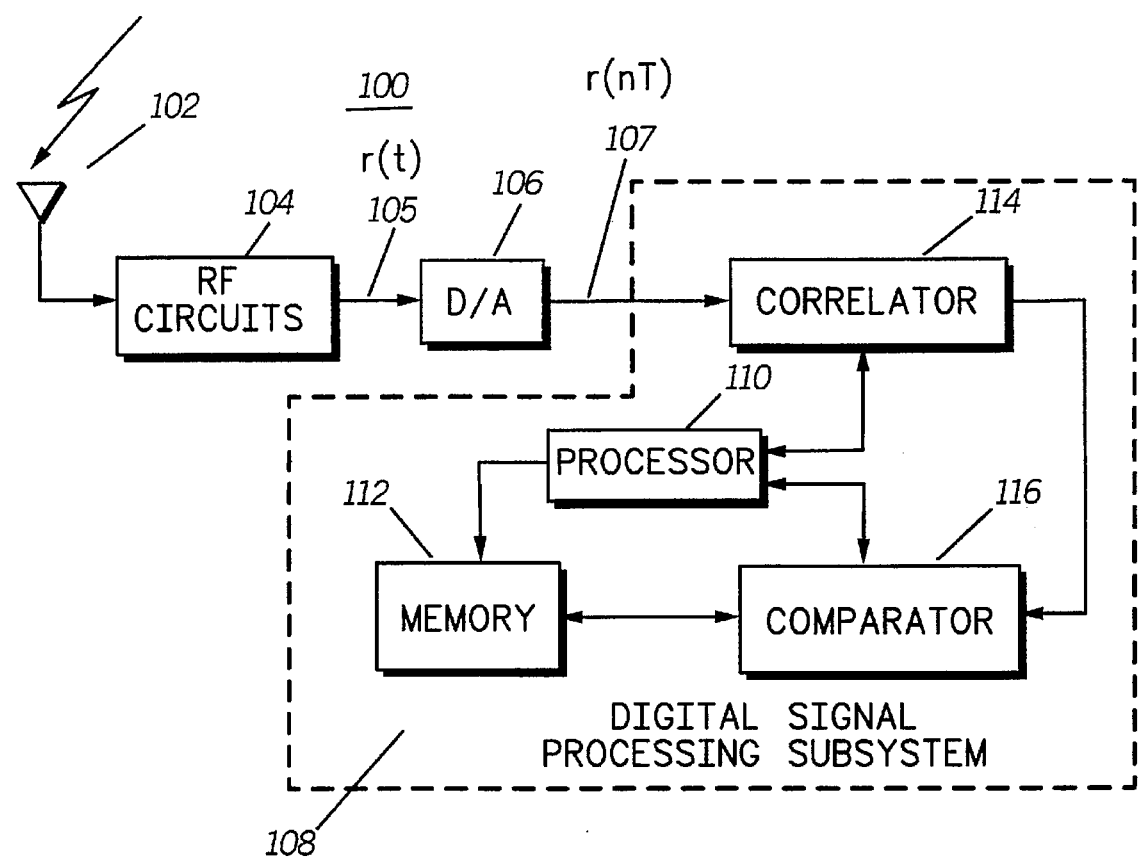
FIG. 1 is a block diagram of a receiver in accordance with the present invention.

Referring now to FIG. 1, a block diagram of a receiver 100 is shown in accordance with the principles of the present invention. A Radio Frequency (RF) signal is received by an antenna 102 and coupled to a RF circuit block 104. This block 104 includes filters, power supplies, and demodulator circuits. The operation of these elements is well known in the art. Therefore, to avoid unnecessary complications, their operation is not presented here. The analog demodulated output of the RF circuits 104 is coupled to a Digital to Analog converter (D/A) 106 for conversion to digital. The digitized output of the D/A 106 is signal r(nT) 107 and is routed to a correlator 114. The correlator 114 calculates the auto-correlation function of the digitized signal r(nT) 107 by over-sampling it. The correlator 114 uses a memory block 112 which is used to buffer all or a portion of the signal r(nT) 107 in order to generate the auto-correlation function. The correlator 114 provides the calculation means for the receiver 100. The output of the correlator 114 is coupled to a comparator 116 and the processor 110. The comparator 116 along with the processor 110 compare particular points from the output of the correlator 114 to pre-determined values stored in the memory block 112. The results of the comparison are then stored in the memory block 112 and processed by the processor 110 in order to classify the format of the signal r(nT) 107. The term format is used here to generally refer to the signalling format, signalling rate, and modulation type of the signal r(nT) 107. The determination of the signaling format is made with the knowledge that the shape of auto-correlation functions remains the same for various signal having similar properties. With the signal r(nT) 107 classified, the processor 110 proceeds to invoke an appropriate decoder(s) 118 to decode the signal r(nT) 107. The decoder(s) 118 may be a program imbedded in the processor 110. In other words, the processor 110 includes a plurality of decoding routines intended to decode a variety of signals. In these situations and upon completion of the classification routine, the processor 110 invokes the portion of its decoding algorithm that is suitable to decode the signal r(nT) 107 based on the type of signal it is. The collection of the correlator 114, the processor 110, the comparator 116, the decoder 118, and the memory block 112 constitute a Digital Signal Processing (DSP) sub-system 108. One such sub-system is the DSP 56000 available from Motorola Inc. In order to eliminate DC offset in the received signal r(t) which occurs as the result of frequency offset in the FM signal, a DC notch filter can be used to filter the signal r(nT) 107 before being coupled to the correlator 114.

Instead of the auto-correlation function, an alternative embodiment may choose to calculate other forms of correlation functions of a received signal to determine its signalling classification. One such form is cross correlation. Using preambles or sync words a receiver can calculate the cross correlation function of an incoming signal to determine its signalling format and signalling rate.

Figure 4:
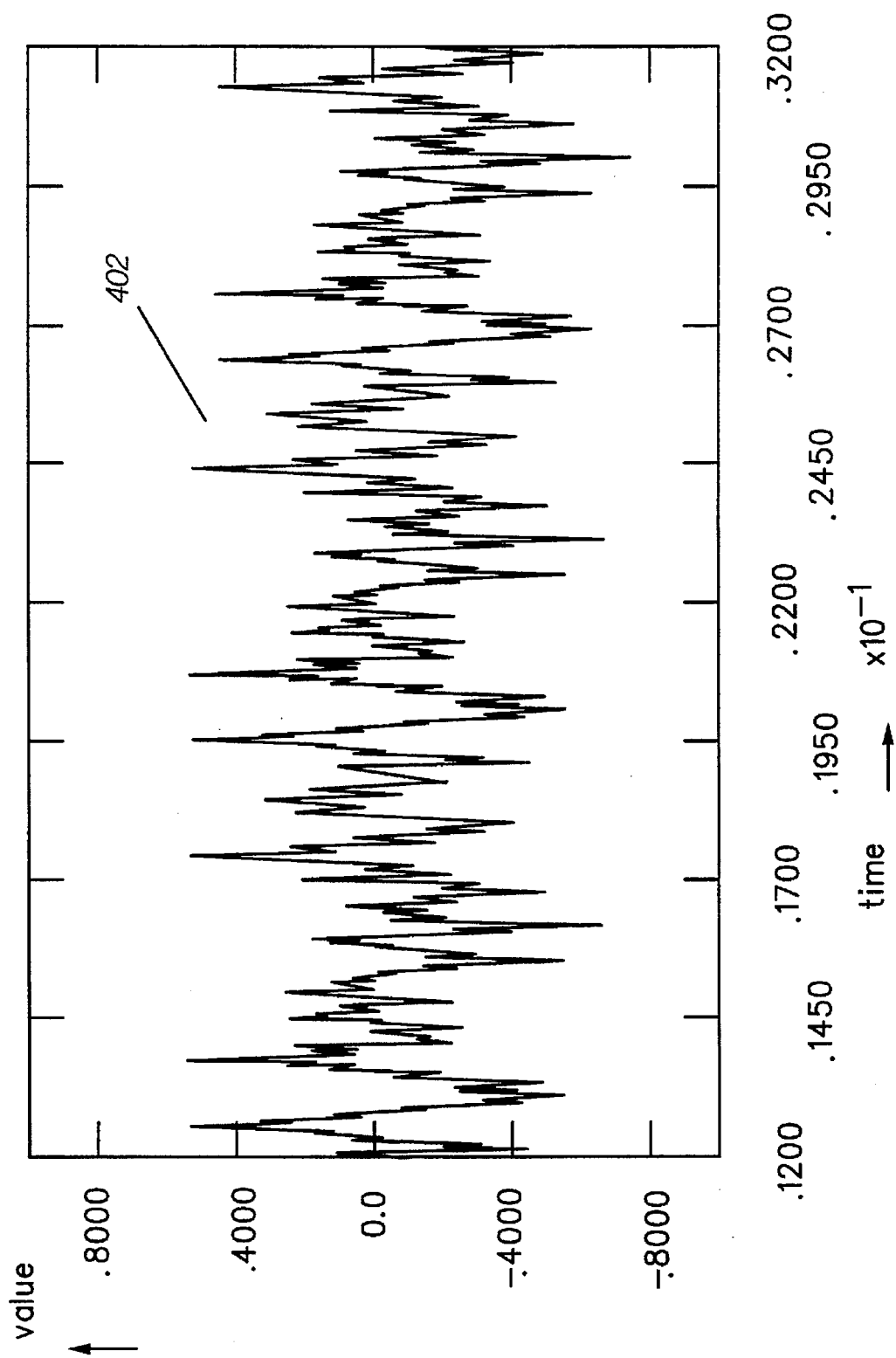
FIG. 4 is a graph of the multi-level signal of FIG. 3 with noise.

The received RF signal at the antenna 102 is the transmitted signal 712 along with any noise components that may have been added to it. This signal is filtered and demodulated by the RF circuits block 104 to produce the signal r(t) 105. FIG. 4 shows a portion of the signal r(t) 105. Signal r(t) 105 is the same signal as 706 with added noise n(t). This is shown by the following equation:

$$r(t)=s(t)+n(t)$$

This signal r(t) 105 is converted to digital via the D/A converter 106 and routed to the correlator 114. The output of the D/A converter 106 is r(nT) 107 where "t" is equal to "nT" with T being the sampling period. Therefore $$r(nT)=s(nT)+n(nT)$$

The output of the correlator 114 is signal 502 of FIG. 5 which has the following mathematical expression:

$$R_{rr}(\tau)=E[r(nT)r(nT+\tau)]$$

$$R_{rr}(\tau)=R_{yy}(\tau)+E[n(nT)s(nT+\tau)+n(nT+\tau)s(nT)+n(nT)n(nT+\tau)]$$

where E[X(t)] is the expected value of X(t).

If n(nT) is randomly distributed, zero means, and mutually independent of s(nT), $$E[n(nT)s(nT+\tau)]=E[n(nT)]E[s(nT+\tau)]=0$$

$$E[n(nT+\tau)s(nT)]=E[n(nT+\tau)]E[s(nT)]=0$$

Thus, $$R_{rr}(\tau)=R_{yy}(\tau)+E[n(nT)n(nT+\tau)]$$

for the case $\tau=0$ $$R_{rr}(0)=E[s(nT)^2]+E[n(nT)^2]$$

for the case $\tau\neq 0$, assuming the noise is uncorrelated $$R_{rr}(\tau)=E[s(nT)s(nT+\tau)]=R_{dd}(\tau)*h'(nT)*h(-nT)$$

Notice that the noise term n(nT) does not contribute to $R_{rr}(\tau)$ for $\tau\neq 0$ The function $R_{rr}(t)$ should exhibit a bell shape, centered around $\tau\neq 0$. Furthermore, for t<1/symbol rate, the samples should be positively correlated. For example, if the signal of the preferred embodiment (4-level 4800 symbols/sec) is sampled four times its symbol rate (i.e. 19.2K samples/sec), r(n+T) and r(n) should be highly correlated and r(n+4T) should be lowly correlated, assuming T=1/sampling rate. Pursuant to the objectives of the preferred embodiment, the following assumptions are made, $f_s$=33.33 KHz and symbol rate=4.8K symbols/sec (6.94 samples per symbol).

In summary, a received carrier signal is demodulated, and converted to digital. A correlator is then used to generate the auto correlation function of the digitized signal. A comparator compares a number of points on the auto-correlation function to relevant points stored in a memory block. A processor takes in the result of this comparison and determines the format of the received signal. With this approach the signalling format and the signalling rate of the received signal are determined. Once the received signal is classified, an appropriate decoder is invoked by the processor to decode the received signal.

Figure 2:
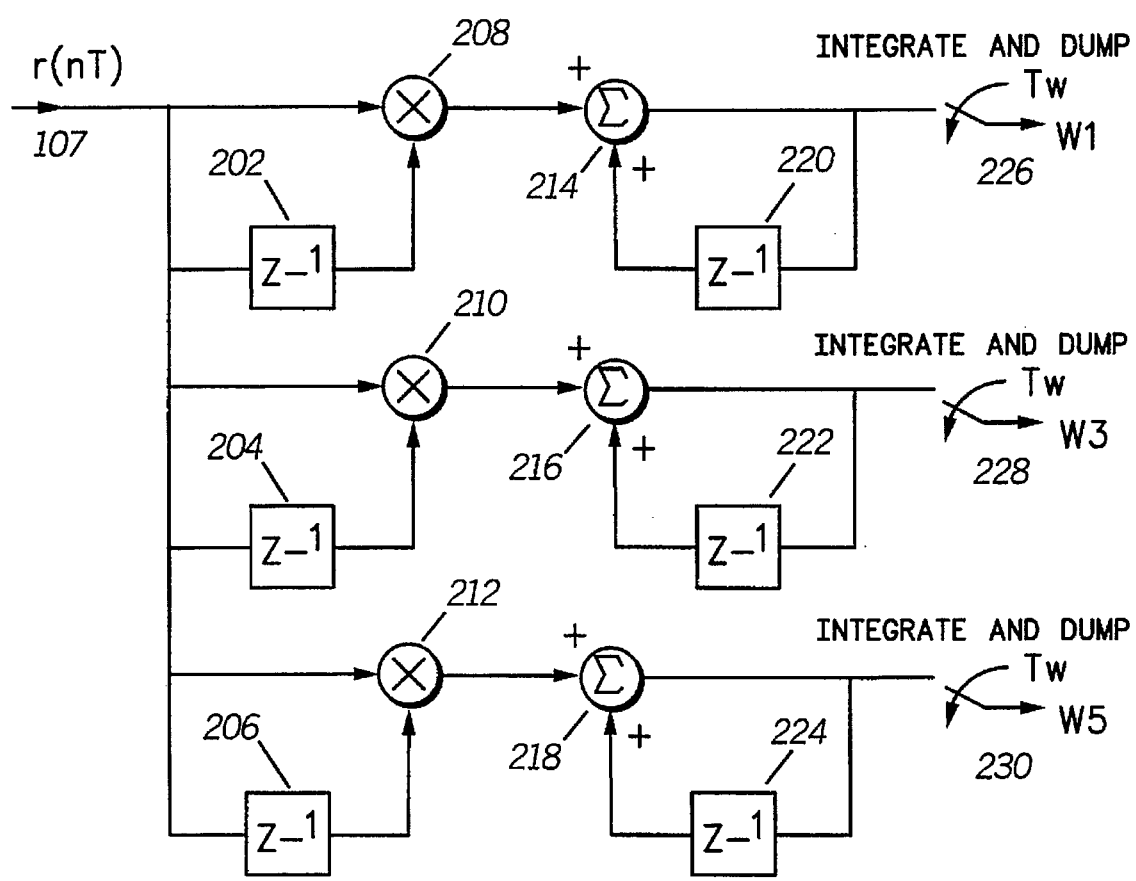
FIG. 2 is a block diagram of a correlator circuit in accordance with the present invention.

Referring now to FIG. 2, a detailed block diagram of the components of the correlator 114 is shown. The input signal r(nT) 107 is applied to three similar sub-circuits each comprising a mixer, a summer, and two delay circuits. In the first sub-circuit, the signal r(nT) 107 is connected to the first input of a mixer 208 and a delay circuit 202. The delay circuit 202 delays the input signal r (nT) 107 by one "T" (sampling period) as denoted by $Z^{-1}$. The delayed signal at the output of the delay circuit 202 is routed to the second input of the mixer 208 where it is mixed with the undelayed r(nT) 107. The output of the mixer 208 is [r(nT)r(nT+τ)] which is coupled to the first input of a summer 214. The output of the summer 214 is fed back into its second input via a delay circuit 220. The delay circuit 220 delays the output signal by one "T" similar to the delay circuit 202. The resultant signal at the output of the summer 214 is $$R_{11}(\tau)=E[r(nT)r(nT+\tau)]$$

This signal is applied to an integrate and dump circuit 226 which takes a snap shot of the value of the auto-correlation function at a particular instant of time. Once this snap shot is taken, the output of the summer 214 is cleared by the integrate and dump circuit 226. The output of this integrate and dump circuit 226 is W1 which is coupled to the comparator 116.

The other two sub-circuits of the correlator 114 are identical to the one described above except for the delay in their delay circuits. The second sub-circuit uses a mixer 210, a summer 216 and two delay circuits 204 and 222 that have a delay of 3τ. The signal at the output of the mixer 210 and the summer 216 are:

$[r(nT)r(nT+3T)]$ and $$R_{33}(\tau)=E[r(nT)r(nT+3T)]$$

respectively. An integrate and dump circuit 228 produces W3 which is coupled to the comparator 116.

Similarly, a third sub-circuit consisting of mixer 212, summer 218, delay circuits 206 and 224 which have a delay of 5T. The signal at the output of the summer 218 is:
ti $R_{55}(\tau)=E[r(nT)r(nT+5T)]$ Also included in the third sub-circuit is an integrate and dump circuit 230 which produces a snap shot of the $R_{55}(\tau)$. The output of the integrate and dump circuit 230 is W5 which is also connected to the comparator 116.

The auto-correlation functions generated by the correlator 114 are stored in the memory 112 for comparison purposes. The processor 110 and the comparator 116 normalize and compare W1, W3, and W5 with their respective predetermined values stored in the memory block 112. With the result of this comparison available, the processor 110 classifies the signalling scheme and the signalling rate of the signal r(nT) 107. The classification of the signal r(nT) 107 allows the processor 110 to invoke the proper algorithm to decode the signal r(nT) 107. With the knowledge of the classification of the signal r(nT) 107, it is no longer necessary for the radio 100 to have a number of decoders running simultaneously. Hence, a significant saving in current is achieved.

Assuming:

$$E[r(nT)r(nT+T)]=a1$$

$$E[r(nT)r(nT+3T)]=a3$$

$$E[r(nT)r(nT+3T)]=a5$$

a1, a3, and a5 can be computed over a long period of time. Let a3'=a3/a1 and a5'=a5/a1. We know that W1, W3, and W5 are the computed auto-correlation over an observation time of Tw. If we assume $R_{rr}(T)$=a1, $R_{rr}(3T)$=a3, and $R_{rr}(5T)$=a5, where T=1/33.33 KHz the error ε can be computed as follows;

$$\epsilon=\alpha_3[(W3/W1)-a3']^2+\alpha_5[(W5/W1)-a5']^2$$

where α3 and α5 are the weighting variables (positive) for the two error terms. In the processor 110, it is easier to manipulate multiplication than division. Thus, the form $$\epsilon W1^2=\epsilon 3[W3-a3'W1]^2+\alpha 5[W5-a5'W1]^2$$

should be easier to implement. If the detection threshold is $E_r$, we have $$E_rW1^2-\{\alpha 3[W3-a3'W1]^2+\alpha 5[W5-a5'W1]^2\}>0$$

indicating detection of the expected signal type, and $$E_rW1^2-\{\alpha 3[W3-a3'W1]^2+\alpha 5[W5-a5'W1]^2\}<0$$

indicating no detection.

Notice that the error s is all normalized to W1. By doing this it can eliminate some of the problems associated with the data pattern. If an absolute threshold is used, due to the finite observation time Tw, short term variations in the data pattern can false the detector. As an example, if more low level symbols are sent, the difference between the expected value $R_{rr}(T)$ and the computed one (W1) is going to be larger than the expected long term average and thus false the detector. In other words, the normalized algorithm detects the shape of the auto-correlation function $R_{rr}(t)$ instead of the magnitude. As long as τ is less than the baud period (1/4800 sec), the algorithm can take on various forms. For the most part, $R_{rr}(T)$, $R_{rr}(3T)$, and $R_{rr}(5T)$ are chosen for convenience. However, using $R_{rr}(T)$ as the reference for normalization has the advantage of minimizing the noise effect and the amplitude variations on the detection algorithm. Furthermore, it is advisable to keep τ small for producing a good result.

To summarize, it has been shown that by over-sampling a signal, an auto-correlation function can be used to implement a signal classifier. A received signal is demodulated and digitized before being submitted to an auto-correlator function generator. Various properties and particularly the shape of the auto-correlation function is used to determine the classification of the received signal. Knowing the classification of the signal, a processing unit can invoke the appropriate algorithm to decode it. The use of this feature eliminates the need to have separate decoders running simultaneously avoiding significant loss in the efficiency. The advantage of this algorithm in classifying a received signal is its immunity to noise and amplitude variations plus ease of implementation.

Although the above implementation is presented as being the preferred embodiment, it is well understood that minor modifications are possible without departing from the spirits of the present invention. Those skilled in the art appreciate the use of other circuits to produce similar results. The presentation of this preferred embodiment is aimed at rendering the principles of the present invention more understandable and shall not be construed as limitations.

What is claimed is:

1. A receiver for receiving and decoding a carrier signal modulated with an information signal having one of a plurality of formats, the receiver comprising:

receiver means for receiving and demodulating a received signal to produce a demodulated signal;

calculation means for calculating the correlation function of the demodulated signal;

classifier means responsive to the calculation means for classifying the format of the demodulated signal; and decoder means responsive to the classifier means for decoding the demodulated signal.

2. The receiver of claim 1, wherein the means for calculating the correlation function includes means for calculating the auto-correlation function of the demodulated signal.

3. The receiver of claim 1, wherein the information signal includes a digital signal.

4. The receiver of claim 3, wherein the digital signal includes a multi-level digital signal.

5. The receiver of claim 1, wherein the classifier means includes a Digital Signal Processor (DSP).

6. The receiver of claim 1, wherein the classifier means includes means for comparing a plurality of values of the calculated correlation function with a plurality of predetermined values.

7. The receiver of claim 1, wherein the classifier means includes means for classifying the signalling format of the demodulated signal.

8. The receiver of claim 1, wherein the classifier means includes means for classifying the signalling rate of the demodulated signal.

9. A receiver for receiving a carrier signal modulated with an information signal having one of a plurality of signaling formats, the receiver comprising:

receiver means for receiving and demodulating the carrier signal to produce a demodulated information signal;

signal processing means having a plurality of decoding routines suitable for decoding the plurality of signalling formats, including:
- calculation means for calculating the auto-correlation function of the demodulated information signal; and
- invoking means responsive to the calculation means for invoking one of the plurality of decoding routines suited to decode the demodulated information signal.

10. The receiver of claim 9, wherein the signal processor means includes a Digital Signal Processor (DSP).

11. The receiver of claim 9, wherein the signal processor means includes memory means for buffering a portion of the demodulated information signal.

12. The receiver of claim 9, wherein the signal processor means includes memory means for storing the plurality of decoding routines.

* * * * *